United States Patent
Dougal et al.

(10) Patent No.: US 6,793,184 B2
(45) Date of Patent: Sep. 21, 2004

(54) PORTABLE FISHING ROD HOLDER

(76) Inventors: Patrick R. Dougal, 8327 S. Sandusky Ave., Tulsa, OK (US) 74137; Wayne L. Weatherly, 9014 S. Gary Ave., Tulsa, OK (US) 74137

( * ) Notice: Subject to any disclaimer, the term of this patent is extended or adjusted under 35 U.S.C. 154(b) by 0 days.

(21) Appl. No.: 10/303,123

(22) Filed: Nov. 25, 2002

(65) Prior Publication Data

US 2004/0099776 A1 May 27, 2004

(51) Int. Cl.$^7$ .................................................. A47G 1/17
(52) U.S. Cl. ............................... 248/206.5; 211/70.8
(58) Field of Search ................... 248/206.5, 205.1, 248/200, 309.4, 683, 4.9; 211/70.8, 64, 70.2

(56) References Cited

U.S. PATENT DOCUMENTS

| | | | |
|---|---|---|---|
| 2,959,295 A | 11/1960 | Howard et al. | 211/64 |
| 3,266,633 A | 8/1966 | Graebner | 211/60 |
| 3,514,731 A * | 5/1970 | Drake | 335/285 |
| 3,746,177 A | 7/1973 | Vilotti | 211/64 |
| 4,036,368 A | 7/1977 | Munsch | 211/60 R |
| 4,081,114 A * | 3/1978 | Inoue | 224/242 |
| 5,267,763 A * | 12/1993 | Klein | 293/128 |
| 5,577,697 A * | 11/1996 | Accordino | 248/206.5 |
| 5,642,818 A | 7/1997 | Brent et al. | 211/70.5 |
| 5,715,952 A | 2/1998 | Chichetti | 211/70.8 |
| 5,755,342 A | 5/1998 | Hoffman | 211/64 |

* cited by examiner

Primary Examiner—Leslie A. Braun
Assistant Examiner—A. Joseph Wujciak
(74) Attorney, Agent, or Firm—William S. Dorman

(57) ABSTRACT

A portable fishing rod holder for use in securing a fishing rod to a vehicle or other ferrometallic surface by means of a generally rectangular elongated portion having a pair of downwardly extending legs in perpendicular relation thereto, each leg being provided with a magnet inserted therein in countersunk relation, whereby a fishing rod may be captured and held within the confines of the fishing rod holder when said fishing rod holder is employed in conjunction with a ferrometallic surface, the fishing rod being held in an upright position with its base resting on the ground or suspended from a guide eye, and the fishing rod holder being further provided with a protuberance having an opening therein through which a key ring or similar device may be threaded, said fishing rod holder being of sufficiently small size to be carried on a key ring, fisherman's vest, or in a pocket.

2 Claims, 2 Drawing Sheets

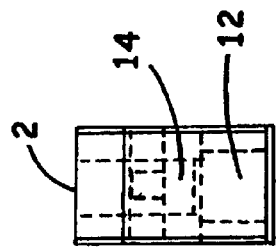
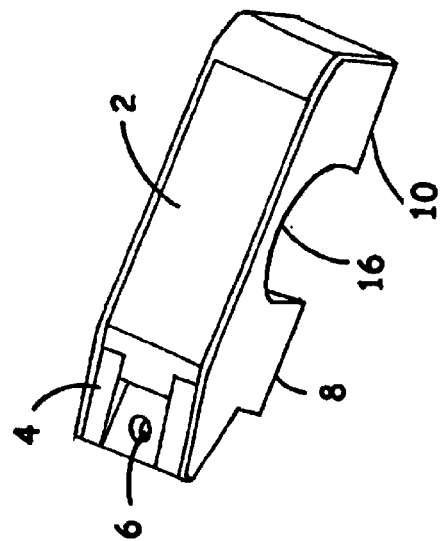
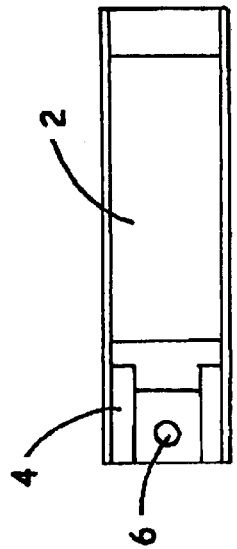
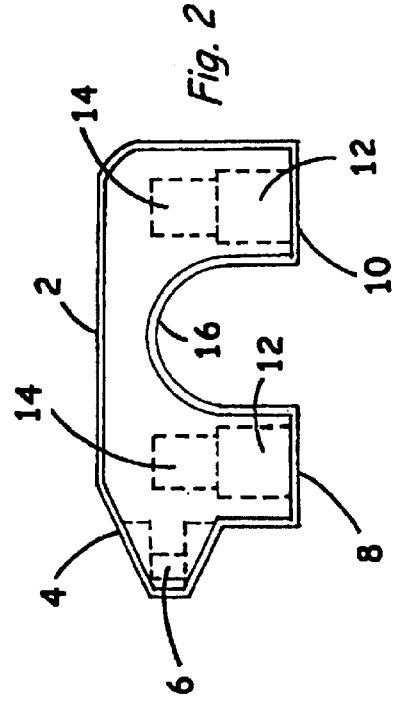
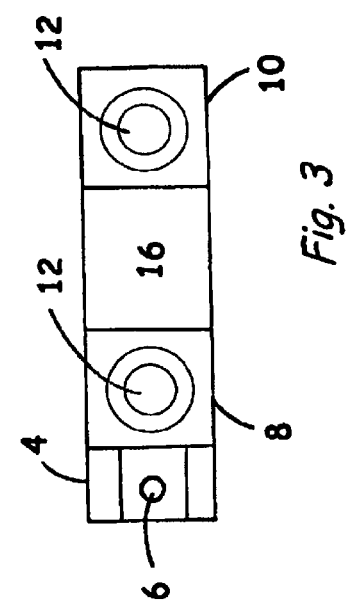

PORTABLE FISHING ROD HOLDER

BACKGROUND OF THE INVENTION

1. Field of the Invention

Fishing rods vary in length, some ranging up to fourteen feet long. Longer rods are often manufactured in pieces, requiring a fisherman to assemble each rod prior to use and permitting the rod to be disassembled for ease in transportation. It is common practice for fishermen to take a variety of fishing rods when going on a fishing excursion, each rod requiring approximately ten minutes to assemble and, upon arriving at their destination, to remove the rods from their vehicle, assemble each rod and line the assembled rods up alongside the vehicle. However, fishing rods can be very expensive and are manufactured from delicate materials that can be damaged in or around the motor vehicle. Even a small scratch or nick in the outer surface of the rod can damage the integrity of the rod. Fishing rods propped against the side of a vehicle can slide to the ground, scratching the vehicle paint and placing the rod in danger of being stepped on and broken. Alternatively, the rod can slide into a door opening and be broken when the door is closed. The present invention provides a portable means for affixing the fishing rod to the side of a vehicle having a ferrometallic surface whereby the rod will not slide or risk damage by falling into an open doorway.

The present invention relates to a portable magnetic fishing rod holder for use in conjunction with a vehicle or other ferrometallic surface. More particularly, the present invention relates to a portable fishing rod holder device which may be affixed to the side of a vehicle by means of two downwardly extending legs having strong magnets inserted and recessed therein, the two downwardly extending legs having a semi-circular recess therebetween to permit a fishing rod to be engaged or captured within the confines of the device to prevent the rod from being blown or knocked over.

2. The Prior Art

There are a number of patents that show or relate to devices for holding fishing rods. Some fishing rod holders are free-standing, while others have a means for attaching to a vehicle. It is believed to be novel to provide a small portable magnetic fishing rod holder having two downwardly extending magnetic legs which contact the side of a vehicle or other ferrometallic surface and a semi-circular recess therebetween in which a fishing rod may be suspended by a guide eye on the rod or may rest against the side of a vehicle.

A preliminary patentability search was conducted on this invention and the following listed references were uncovered in the search:

| Inventor | Patent No. | Date |
| --- | --- | --- |
| Vilotti | 3,746,177 | Jul. 17, 1973 |
| Hoffman | 5,755,342 | May 26, 1998 |
| Munsch | 4,036,368 | Jul. 19, 1977 |
| Chichetti | 5,715,952 | Feb. 10, 1998 |
| Brent, et al. | 5,642,818 | Jul. 1, 1997 |
| Graebner | 3,266,633 | Aug. 16, 1966 |
| Howard, et al. | 2,959,295 | Nov. 8, 1960 |

Vilotti U.S. Pat. No. 3,746,177 is vaguely similar to the present invention in that it describes a magnetic device which may be used to prop a fishing rod against the side of a vehicle. However, the Vilotti device was not intended to exclusively accommodate a fishing rod, nor does it create an area of confinement in which the rod may be held. On the contrary, Vilotti recites a "Portable Magnetic Rack for Guns, Fishing Rods and the Like" having a series of recessed areas into which a fishing rod or gun barrel may be "leaned into" the slot such that the gun barrel or fishing rod rests against a vehicle. Vilotti does not protect against the rod being blown over or knocked out of the recessed area in the event of a strong wind or a person bumping against the rod.

The remaining patents are not considered to be particularly pertinent to the present invention. Hoffman U.S. Pat. No. 5,755,342 shows a collapsible gun rack having a plurality of spaces in which a gun can rest in a vertical position. Munsch U.S. Pat. No. 4,036,368 shows a portable appliance for holding a fishing rod to a railing while the fishing rod is actively employed. Chichetti U.S. Pat. No. 5,715,952 shows a portable fishing rod holding device involving a plurality of tubular members and suction cups to attach the device to a smooth, non-porous surface. Brent, et al. U.S. Pat. No. 5,642,818 shows a fairly complex device for securing sporting goods, namely skis, to the side of a vehicle. Graebner U.S. Pat. No. 3,266,633 shows a portable holder for guns and fishing rods involving interconnecting pieces. The portable holder recited in Graebner opens outwardly, permitting the gun barrel or fishing rod to rest in the opening but fails to capture the rod securely in the method of the present invention. Howard, et al. U.S. Pat. No. 2,959,295 shows a holder for guns, fishing rods and the like similar to that disclosed in Vilotti, but being attachable to a vehicle by means of a clamp affixed to the fender of the vehicle.

SUMMARY OF THE INVENTION

The present invention comprises a portable magnetic fishing rod holder for securing a fishing rod to the side of a vehicle or other ferrometallic surface. The rod can be secured in a vertical position using a single fishing rod holder or, in the alternative, the rod may be secured horizontally along the body of the vehicle using a plurality of fishing rod holders. The portable fishing rod holder comprises a housing of nylon, plastic, or other suitable material having a generally rectangular shape, the generally rectangular shape having a semi-circular recess therein to form an aqueduct-like shape having an upper portion with two legs extending downwardly therefrom in perpendicular relation, each downwardly extending leg being provided with a magnet inserted therein such that the magnet is fully housed within the leg but stops just short of the end of the leg to prevent the magnet from coming into contact with the surface of the vehicle, and a protuberance extending from the generally rectangular portion, said protuberance being provided with a hole therein through which a key ring may be threaded, the fishing rod holder being sufficiently small that it may be attached to a key ring, attached to a fishing vest, carried in a pocket, or the like. When the device is employed in conjunction with a fishing rod, the fishing rod is placed along the side of the vehicle (or other ferrometallic surface) and the rod holder is then placed over the fishing rod such that the two downwardly extending magnetic legs of the fishing rod holder come into contact with the vehicle (or other ferrometallic surface) on either side of the fishing rod such that the fishing rod is captured and held securely between the two downwardly extending magnetic legs. The base of the fishing rod can rest upon the ground or, in the alternative, a guide eye on the fishing rod may be used to support the weight of the fishing rod above ground as will hereinafter appear. It should be noted that it is also possible to use a plurality of fishing rod holders to mount the rod in a horizontal position along the body of the vehicle (or other ferrometallic surface), but this is not a recommended practice as the rod could be damaged by opening of a door or other similar act.

BRIEF DESCRIPTION OF THE DRAWINGS

FIG. 1 is a top view of the present invention showing a protuberance of the rod holder provided with an opening therein through which a key ring or other device may be inserted.

FIG. 2 is a side view of the present invention showing the aqueduct-like shape of the rod holder, the protuberance at one end thereof, and the position of magnets inserted into openings in the respective downwardly extending legs of the rod holder.

FIG. 3 is a bottom view of the present invention showing the position of magnets inserted into openings in the respective downwardly extending legs of the rod holder and showing another perspective of the protuberance attached to the rod holder.

FIG. 4 is a rear view elevation of the present invention showing the position of magnets inserted into openings in the respective downwardly extending legs of the rod holder.

FIG. 5 is a one-quarter view of the present invention as viewed from above showing the overall appearance of the rod holder when viewed from a superior angle.

DETAILED DESCRIPTION OF THE PREFERRED EMBODIMENT

Figure 6:
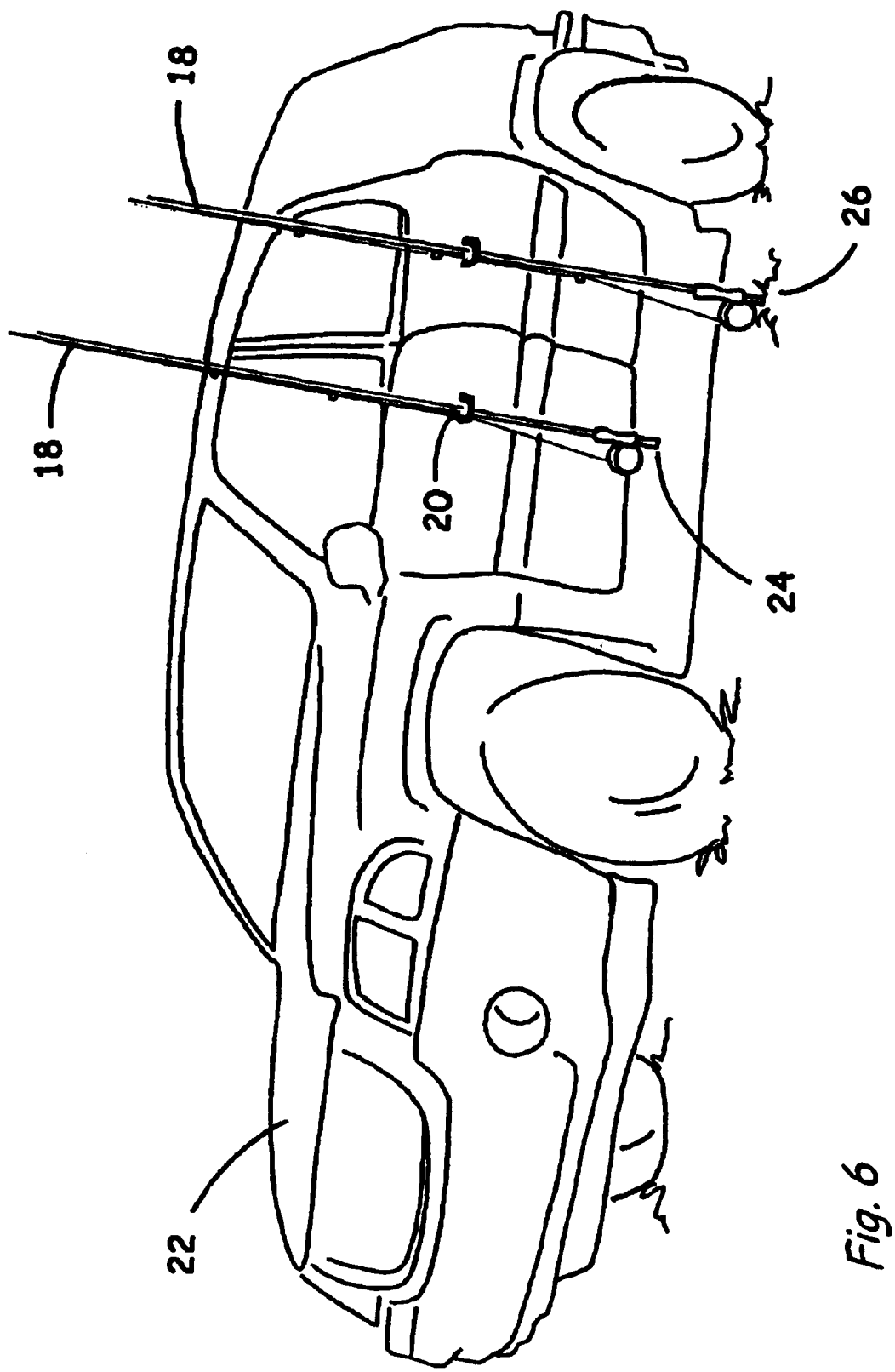
FIG. 6 is a depiction of the present invention employed in use to hold fishing rods against the side of a vehicle.

FIG. 1 is a top view of the fishing rod holder showing the generally rectangular upper portion 2 of the fishing rod holder, a protuberance 4 attached to the generally rectangular portion 2, and an opening 6 in the protuberance 4 through which a key ring (not shown) may be threaded.

FIG. 2 is a side view of the fishing rod holder showing the generally rectangular upper portion 2 of the fishing rod holder, a protuberance 4 attached to the generally rectangular portion 2, an opening 6 in the protuberance 4 through which a key ring (not shown) may be threaded, two downwardly extending legs 8 and 10 in perpendicular relation to the generally rectangular upper portion 2 and forming a substantially aqueduct shaped curved opening 16 therebetween, two magnets 12 positioned in inserted or countersunk relation to the ends of each of the two downwardly extending legs 8 and 10, and two hollow recessed portions 14 located immediately above each of the two magnets 12 to facilitate placement of the magnets 12.

FIG. 3 is a bottom view of the fishing rod holder showing a protuberance 4 attached to the generally rectangular portion 2 (see FIGS. 1 and 2), an opening 6 in the protuberance 4 through which a key ring (not shown) may be threaded, two legs 8 and 10 extending downward in perpendicular relation to the generally rectangular upper portion 2 (see FIGS. 1 and 2), a substantially aqueduct shape resulting from a semi-circular recess 16 formed between the two downwardly extending legs 8 and 10, and two magnets 12 positioned in inserted or countersunk relation to the ends of each of the two downwardly extending legs 8 and 10.

FIG. 4 is a rear view elevation of the fishing rod holder showing the generally rectangular top portion 2 of the fishing rod holder, the magnets 12 located in inserted or countersunk relation within the two downwardly extending legs 8 and 10 of the fishing rod holder (see FIGS. 2 and 3), and the location of the hollow recessed portions 14 above the magnets 12 to facilitate placement of the magnets 12.

FIG. 5 is a one-quarter view of the fishing rod holder as viewed from above showing the generally rectangular upper portion 2 of the fishing rod holder, a protuberance 4 attached to the generally rectangular portion 2, an opening 6 in the protuberance 4 through which a key ring (not shown) may be threaded, two downwardly extending legs 8 and 10 extending perpendicular to the generally rectangular upper portion 2 and the substantially aqueduct shape resulting from the semi-circular recess 16 therebetween.

FIG. 6 is a depiction of the present invention employed in use to hold a fishing rod 18 against the side of a vehicle 22. When the two downwardly extending legs 8 and 10 of the fishing rod holder are placed against the side of a vehicle 22 in perpendicular relation thereto, the magnets 12 contained within the two downwardly extending legs 8 and 10 will exert a force of sufficient strength to hold the fishing rod holder firmly and securely against the side of the vehicle 22. A guide eye 20 can be used to support the rod when the fishing rod holder is engaged against the side of the vehicle 22 in such a manner as to capture the fishing rod 18 at a point immediately below the guide eye 20 so that the guide eye 20 rests against the fishing rod holder. Alternatively, the fishing rod 18 can be engaged by the fishing rod holder with the base 24 of the fishing rod resting upon the ground 26.

What is claimed is:

1. A fishing rod holder securing a fishing rod to a ferromagnetic surface, said fishing rod holder comprising a housing having an elongated generally rectangular shape, the elongated generally rectangular shape having a semi-circular recess therein having an upper portion with two legs extending downwardly thereform in a perpendicular arrangement, each of the downwardly extending legs being provided with a magnet recessed therein, the fishing rod is captured in the semi-circular recess between the downwardly extending legs when the downwardly extending legs of the fishing rod holder are employed against said surface, the semi-circular recess being of suffícent diameter to permit passage of and surround a shaft of the fishing rod yet having a sufficient small diameter so as to prevent excessive movement of the shaft of the fishing rod and further preventing a guide eye mounted on the shaft of the fishing rod from passing therethrough wherein the fishing rod is suspended by the guide eye resting on the fishing rod holder such that an end of the fishing rod does not contact the ground, the magnets contained within the downwardly extending legs being recessed into a space within the downwardly extending leg which space is slightly deeper than the magnet such that the magnet is countersunk within the receiving leg so as not to be flush with a base of the downwardly receiving legs to prevent direct contact between the magnet and the ferromagnetic surface onto which the fishing rod holder is mounted.

2. A fishing rod holder as set forth in claim 1 wherein the fishing rod holder is provided with a protuberance having an opening therein through which a key ring or similar device may be threaded, whereby the fishing rod holder may be easily transported.

* * * * *